US009963330B2

(12) United States Patent
Huether et al.

(10) Patent No.: US 9,963,330 B2
(45) Date of Patent: May 8, 2018

(54) TRUCK

(71) Applicant: NOBLELIFT INTELLIGENT EQUIPMENT CO., LTD., Huzhou, Zhejiang (CN)

(72) Inventors: Sebastian Alexander Huether, Huzhou (CN); Haihong Tang, Huzhou (CN)

(73) Assignee: NOBLELIFT INTELLIGENT EQUIPMENT CO., LTD., Huzhou (CN)

( * ) Notice: Subject to any disclaimer, the term of this patent is extended or adjusted under 35 U.S.C. 154(b) by 138 days.

(21) Appl. No.: 14/654,563

(22) PCT Filed: May 29, 2014

(86) PCT No.: PCT/CN2014/078723
§ 371 (c)(1),
(2) Date: Jun. 22, 2015

(87) PCT Pub. No.: WO2015/180082
PCT Pub. Date: Dec. 3, 2015

(65) Prior Publication Data
US 2016/0311670 A1 Oct. 27, 2016

(51) Int. Cl.
*B62B 3/06* (2006.01)
*B66F 9/065* (2006.01)
(Continued)

(52) U.S. Cl.
CPC ............ *B66F 9/065* (2013.01); *B62B 3/0606* (2013.01); *B62B 3/0618* (2013.01); *B66F 9/075* (2013.01); *B66F 9/07572* (2013.01); *B66F 9/22* (2013.01)

(58) Field of Classification Search
CPC .. B66F 9/065; B66F 9/075; B66F 9/22; B66F 9/07572
See application file for complete search history.

(56) References Cited

U.S. PATENT DOCUMENTS 2,942,679 A * 6/1960 Gibson ................. B62B 3/0612
180/19.2
3,016,973 A * 1/1962 Williamson ........ B66F 9/07572
180/13
(Continued)

FOREIGN PATENT DOCUMENTS

CN 202864840 U 4/2013

*Primary Examiner* — David Bryant
*Assistant Examiner* — Nirvana Deonauth (57) ABSTRACT

The present invention discloses a truck, comprising a frame, forklifts connected with the frame, driven wheels mounted on the forklifts, a battery unit, an operating handle, a hydraulic pump station system and a top cover permanently connected with the frame; a driving wheel unit intended for driving the truck, wherein the hydraulic pump station system comprises a driving mechanism and a pump body with a case, the top of the pump body is permanently connected with the top cover and the bottom is connected with the driving wheel unit, a handle mounting portion is provided on the pump case and connected with the operating handle, the driving mechanism is located on the side of the handle mounting portion opposite to the pump body and away from the forklifts. The present invention has the advantages of low cost, simple and compact structure and steady operation.

20 Claims, 5 Drawing Sheets

(51) Int. Cl.
*B66F 9/075* (2006.01)
*B66F 9/22* (2006.01)

(56) References Cited

U.S. PATENT DOCUMENTS

| | | | | |
|---|---|---|---|---|
| 4,615,533 A | * | 10/1986 | Sewell | B62B 3/0618 |
| | | | | 280/43.12 |
| 8,336,654 B1 | * | 12/2012 | Licon | B60K 1/00 |
| | | | | 180/65.1 |
| 2010/0096606 A1 | * | 4/2010 | Lee | B66F 5/04 |
| | | | | 254/10 C |
| 2012/0269606 A1 | * | 10/2012 | Newell | B62B 5/0033 |
| | | | | 414/495 |
| 2014/0124299 A1 | * | 5/2014 | Royer | B66F 9/22 |
| | | | | 187/234 |
| 2015/0102274 A1 | * | 4/2015 | He | B62B 3/0618 |
| | | | | 254/2 C |

* cited by examiner

TRUCK

BACKGROUND OF THE INVENTION

Technical Field

The present invention relates to the technical field of handling machinery, and more specifically, to a truck.

Description of Related Art

The Chinese utility model of CN 202864840 U with the date of authorized announcement Apr. 10, 2013 discloses a small-sized electric truck comprising a frame, bilaterally symmetrical forks disposed in front of the frame and a bearing wheel rocking carrier mechanism mounted at the front part of the forks' underside, wherein a driving wheel driven by a motor is provided at the back of the frame, a swing bearing is provided above the driving wheel, the driving wheel case is provided with an operating handle, the operating handle is operated by the swing bearing to turn the direction, the frame is provided with a power box in which a battery is provided, above the battery with an in-built charger is provided that is connected with a controller and a hydraulic pump station assembly, which controls the lifting and lowering of the forklifts, the battery supplies power for the controller, motor and hydraulic pump station assembly, and the operating handle is provided with an accelerator and an emergency reverse controller.

However, it is found in practice that the prior-art electric trucks have disadvantages such as the large volume and high cost of the hydraulic pump station and the relatively large volume of the trucks, which affects the steady operation.

BRIEF SUMMARY OF THE INVENTION

The present invention aims at, by overcoming the disadvantages in the prior art, providing a truck which has the advantages of low cost, simple and compact structure, small size, ease of operation, less space occupied and steady operation.

To solve the technical problems above, the technical solution of the present invention is as below: a truck, comprising a frame, forklifts connected with the frame, driven wheels mounted on the forklifts, a battery unit, an operating handle, a hydraulic pump station system and a top cover permanently connected with the frame; a driving wheel unit intended for driving the truck to move, wherein the hydraulic pump station system comprises a driving mechanism and a pump body with a case, the top of the pump body is permanently connected with the top cover and the bottom is connected with the driving wheel unit, a handle mounting portion is provided on the pump case and connected with the operating handle, the pump body is capable of propping up the top cover driven by the driving mechanism and capable of lowering it without any power under the control of the operating handle, and the driving mechanism is located on the side of the handle mounting portion opposite to the pump body and away from the forklifts After repeated study, testing and analysis, the applicant found that the reason for the large volume, loose structure and unsteady operation of the prior-art trucks is that the prior-art hydraulic pump station system is so complicated, comprising other parts such as a motor, an oil pump, an oil tank and a solenoid directional control valve in addition to the oil cylinder connected with the top cover, that after assembly it has a very large volume and is generally mounted on the frame, which lengthens the body of the whole truck and increases the distance between the driving wheel and the driven wheels, and what's more, affects the steady operation; for this reason, the hydraulic pump station system of the whole truck is optimized so as to minimize the volume by the following methods: first, a pump body is used to work with the driving mechanism, wherein an oil tank and an oil cylinder are integrated in the pump body, which substantially decreases the volume of the whole hydraulic pump station system and the length of the whole forklifts, improving the steadiness, and besides, lifting is achieved directly by the driving mechanism and lowering is achieved under the gravity of the frame and the lifted loads so that a solenoid directional control valve is no longer required, simplifying the structure and decreasing the volume, and it is helpful for balancing article safety and efficiency by employing the operating handle to control the lowering speed. Second, the mounting position of the driving mechanism is optimized. Upon the determination of the components of the whole hydraulic pump station system, we began to study how to decrease the volume of a truck. After a long-term study, numerous real object tests and careful analysis, the mounting position of the driving mechanism is optimized in such a way that the mounting position of the driving mechanism is arranged on the outside of the pump body, i.e. opposite to the pump body, on the other side of the handle mounting portion and away from the forklifts, thus saving the space for placing the driving mechanism under the top cover, decreasing the distance between the driving wheels and driven wheels further, improving the moving steadiness of the truck and making the truck more compact. The position for the driving mechanism is originally reserved for the normal operation of the operating handle, so such an arrangement will not affect the normal operation of the operating handle, while the length of the truck is lengthened and the operation becomes much steadier.

Preferably, the driving mechanism comprises a motor permanently connected with the pump case and a hydraulic pump connected with the motor.

The motor and the hydraulic pump can be connected together directly or by connecting pieces such as coupling.

Preferably, the motor and the hydraulic pump are vertically arranged.

The vertical arrangement of the motor and the hydraulic pump can decrease the lateral volume, making the truck more compact, and besides, it is easy for the truck to move, reducing its influences on the steadiness of the truck, and does not affect the normal operation of the operating handle, thus ensuring the compactness and moving steadiness of the whole truck.

Preferably, the pump case comprises a manual check valve with a forward inlet and a forward outlet arranged in the pump case, an oil delivery cylinder arranged in the pump case and permanently connected with the top cover, a high-pressure oil inlet arranged in the pump case and communicating the forward outlet, an oil storage chamber communicating the forward inlet and an oil outlet communicating the oil storage chamber.

The manual check valve, connected with the operating handle, is controlled by the operating handle to lower the top cover and the oil delivery cylinder without any power; the driving mechanism drives the hydraulic oil in the oil storage chamber to prop up the oil delivery cylinder so as to achieve lifting; the manual check valve is arranged in the pump case, decreasing the volume of the whole truck further.

Preferably, the pump case is provided with a base plate extending away from the forklifts; the edges of the base plate are provided with enclosure plates extending upwards, and the motor is fixed on the base plate and the enclosure plates enclose part of the motor at least.

The base plate is arranged on the pump case to facilitate the fixed connection of the motor so that the motor and the pump case are fixedly connected to form a whole and rotate together when the forklifts are operating. The enclosure plates enclose part of or the whole motor at least, serving as a protection for it and strengthening the structure. Such arrangement ensures not only a compact structure, but also the firm mounting of the motor, ensuring the steadiness of the truck in operation.

Preferably, the handle mounting portion comprises a pair of hinged mounting plates that can be integral-formed or assembled with the pump case, the base plate and the enclosure plates.

Compared with the structure formed by assembling parts manufactured separately, the integral-formed structure can be manufactured in large quantities with high pass rate and low rejection rate, and more importantly, the hinged mounting plates, pump case, base plate and enclosure plates are made as a single piece by integral-forming, sparing the space necessary for mounting and dismounting all parts, which decreases the volume further and makes the single piece more compact in this application.

Preferably, the hydraulic pump is located under the motor.

Compared with the common arrangement that the hydraulic pump is located above the motor for the purpose of repair, the arrangement of the hydraulic pump under the motor with the hydraulic pump connected with the pump case has a special significance that the hydraulic pump can be away from the oil delivery cylinder so as to make a more compact and steady truck, because if the hydraulic pump is located above the motor, the hydraulic pipes connected with the pump case have to be connected from top to bottom so as to connect the pump to the pump case since the oil delivery cylinder is connected with the top cover, thus complicating the laying of pipes and the structure of the truck and increasing the volume of the truck, and such arrangement will affect the normal operation of the operating handle and thus affect the steady structure of the whole truck; therefore, the arrangement of the hydraulic pump under the motor makes the connection with the pump case more compact and does not affect the normal operation of the operating handle.

Preferably, the operating handle is provided with a pair of connecting pieces hinged with the handle mounting portion and a passage hole of the driving mechanism is reserved between the pair of the connecting pieces.

Preferably, when the driving mechanism is in the passage hole of the driving mechanism, the pair of the connecting pieces is on each side of the driving mechanism.

The connecting pieces being on each side of the driving mechanism ensures the connection strength between the operating handle and the handle mounting portion and makes full use of the space between the connecting pieces so that the driving mechanism can go through the passage hole of the driving mechanism when the operating handle is active while the space under the operating handle is properly utilized.

Preferably, when the operating handle is vertical, at least part of the driving mechanism is under the operating handle.

Such arrangement allows the driving mechanism to be as close to the pump case as possible so that the distance between them is minimized to obtain a compact truck, and besides, avoids affecting the operating handle as much as possible.

A truck, comprising a frame, forklifts connected with the frame, driven wheels mounted on the forklifts, a battery unit, an operating handle, a hydraulic pump station system and a top cover permanently connected with the frame; a driving wheel unit and an appliance controller intended for driving the truck to move, wherein the hydraulic pump station system comprises a driving mechanism and a pump body with a case, the top of the pump body is permanently connected with the top cover and the bottom is connected with the driving wheel unit, a handle mounting portion is provided on the pump case and connected with the operating handle, the pump body is capable of propping up the top cover driven by the driving mechanism and capable of lowering it without any power under the control of the operating handle, the driving mechanism is located on the side of the handle mounting portion opposite to the pump body and away from the forklifts, and the appliance controller is fixed on the pump body.

The beneficial effects of the present invention lie in that

The present invention has the advantages of low cost, simple and compact structure, small size, ease of operation, less space occupied and steady operation.

BRIEF DESCRIPTION OF THE SEVERAL VIEWS OF THE DRAWINGS

The present invention is further detailed by the embodiments in combination with the drawings.

DETAILED DESCRIPTION OF THE INVENTION

The following description is the preferred embodiments of the present invention only, but is not intended to limit the scope of the present invention.

Embodiment I, as shown in FIGS. 1, 2, 3, 4 and 5, a truck comprises a frame 1 fixed with a top cover 7, two symmetrically-arranged forklifts 2 connected with the frame 1, driven wheels 3 mounted on the forklifts 2, a battery unit 4 comprising a battery and a battery box which is permanently connected with the frame, an operating handle 5, and a driving wheel unit 8 intended for driving the electric truck to move, which are all known art, so no further details will be given herein; it also comprises a hydraulic pump station system 6 which is different from the prior-art hydraulic pump station system; in the embodiment, the hydraulic pump station system 6 comprises a driving mechanism 601, comprising a motor 60101 and a hydraulic pump 60102 connected with the motor 60101, and a pump body 602 with a case 60201, wherein the motor 60104 and the case 60201 are permanently connected, the hydraulic pump, which can be a gear pump or a vane pump, can be connected with the motor directly or by connecting pieces such as couplings and operates under the driving of the motor, the top of the pump body 602 is permanently connected with the top cover 7 and the bottom is connected with the driving wheel unit 8, a handle mounting portion 9 is provided on the pump case 60201 and connected with the operating handle 5, the pump body 602 is capable of propping up the top cover 7 driven by the driving mechanism 601 and capable of lowering it without any power under the control of the operating handle 5, and the driving mechanism 601 is located on the side of the handle mounting portion 9 opposite to the pump body 602 and away from the forklifts 2; by such arrangement that the driving mechanism is located on the outside of the pump body, i.e. the other side of the handle mounting portion opposite to the pump body, enables the driving mechanism to be away from the forklifts, saves the space under the top cover and shortens the distance between the driving wheel and the driven wheels of the truck; in order to make the overall structure of the truck more compact, the motor 60101 and the hydraulic pump 60102 are vertically arranged; and the hydraulic pump 60102 is located under the motor, and preferably, the longitudinal center section (longitudinal refers to the direction extending along the length of the forklifts 2) of the driving mechanism 601 coincides with the longitudinal section of the whole truck.

Figure 3:
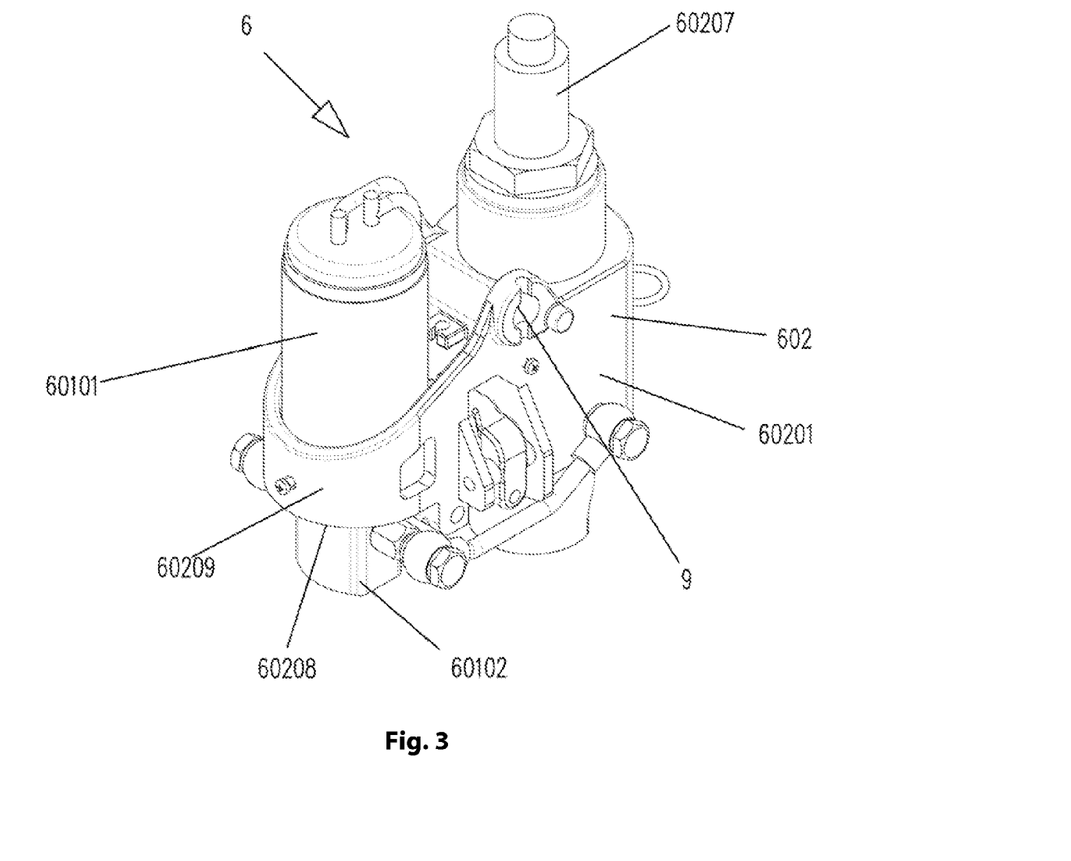
FIG. 3 is a schematic diagram of the hydraulic pump station system in FIG. 1.
Figure 4:
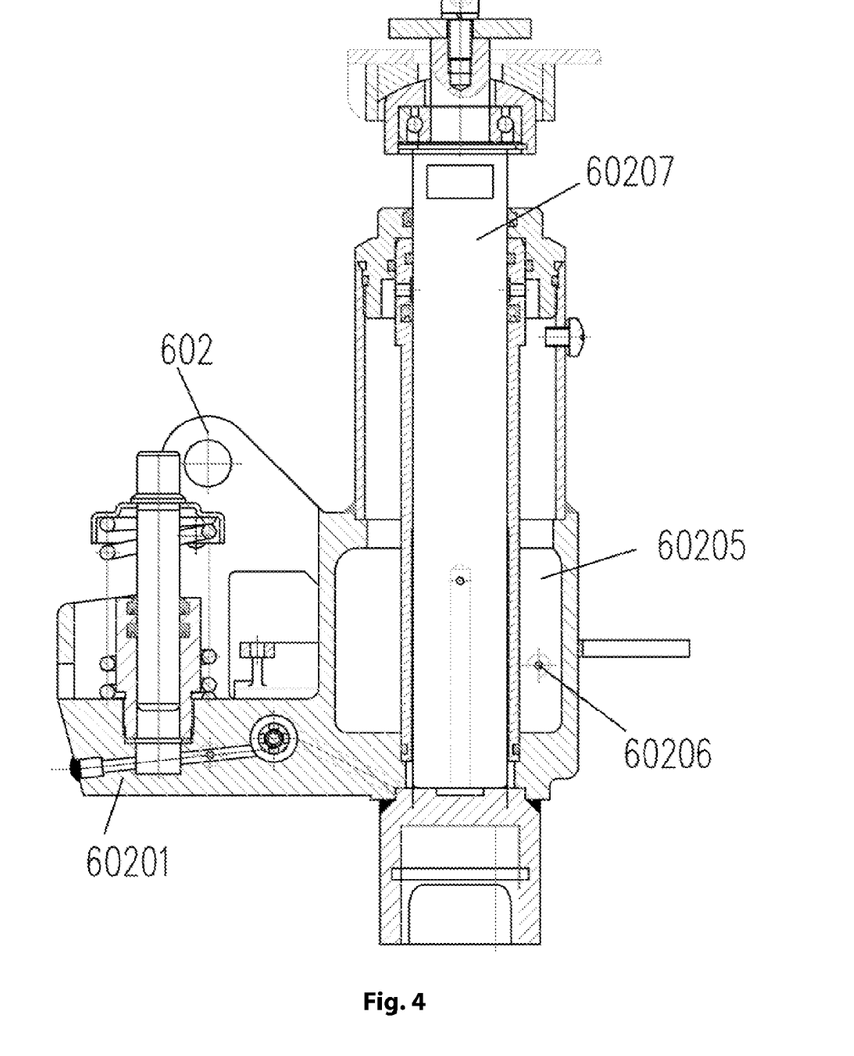
FIG. 4 is a schematic diagram of the oil delivery cylinder in FIG. 1 installed in the pump case.

In the embodiment, the pump body 602 comprises a pump case 60201, a manual check valve 60203 with a forward inlet a and a forward outlet b arranged in the pump case 60201, and an oil delivery cylinder 60207 arranged in the pump case 60201, wherein the pump case 60201 is provided with a high-pressure oil inlet 60204 communicating the forward outlet, an oil storage chamber 60205 communicating the forward inlet and an oil outlet 60206 communicating the oil storage chamber 60205, a safety valve 60202 can be provided inside or outside of the pump case 60201; the number of the safety valve 60202 can be determined based on the actual needs to ensure the safety of the whole hydraulic system; the pump outlet of the hydraulic pump 60102 communicates the high-pressure oil inlet 60204, the pump inlet of the hydraulic pump 60102 communicates the oil outlet 60206, a check valve is provided between the pump outlet and the high-pressure oil inlet of the hydraulic pump 60102 to allow the one-way flow of hydraulic oil from the hydraulic pump 60102 to the high-pressure oil inlet 60204 (not shown in the drawings), wherein the check valve can be tube-type check valve, plate-type check valve or sandwich check valve. In operation, the motor drives the hydraulic pump to rotate and the hydraulic oil flows from the pump outlet into the pump case 60201 through the high-pressure oil inlet 60204, lifting the oil delivery cylinder 60207 and propping the top cover up to the predetermined position; when necessary, operate the operating handle to activate the manual check valve, the hydraulic oil will flow from the forward inlet a to the forward outlet b and finally into the oil storage chamber 60205 under the gravity of the top cover and other loads so as to achieve the lowering of the top cover 7 without any power. Compared with the prior-art truck, a solenoid directional valve is no longer required, reducing the cost and eliminating the problem of oil leakage. In addition, the pump body 602 can be known hand pumps and the hand part can be kept.

For the purpose of fixing the motor, the pump case 60201 is provided with a base plate 60208 extending away from the forklifts 2; the edges of the base plate 60208 are provided with enclosure plates 60209 that extend upwards and enclose part of or the whole motor; the enclosure plates 60209 at the edges of the base plate 60208 and extending upwards form an enclosure structure together with the pump case, which encloses part of or the whole motor; the motor 60101 is fixed on the base plate 60208, the handle mounting portion 9 is arranged between the enclosure plates 60209 and the pump case 60201 and it is connected with both the enclosure plates and the pump case; in the embodiment, the handle mounting portion 9 comprises a pair of hinged mounting plates; furthermore, the hinged mounting plates, the pump case 60201, the base plate 60208 and the enclosure plates 60209 are integral-formed or assembled together, and integral-forming is preferred; besides, the handle mounting portion can be a single plate and intended for connection with the operating handle.

Figure 1:
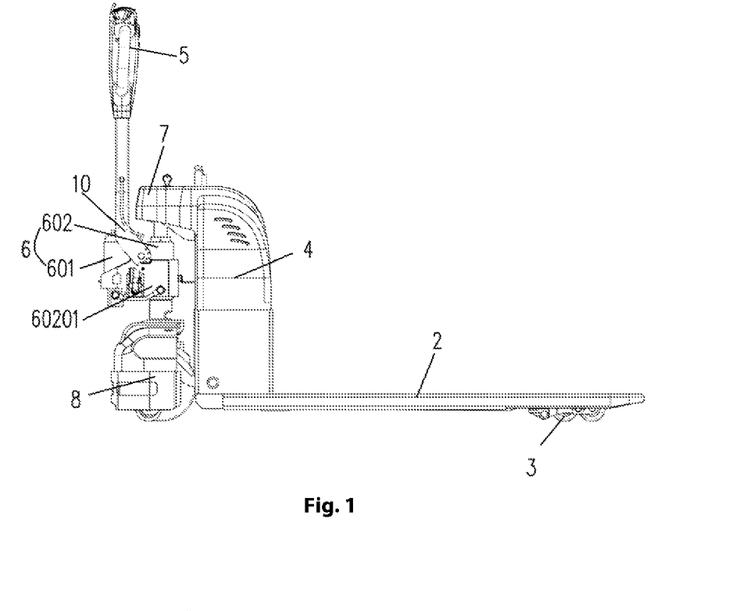
FIG. 1 is a schematic diagram of Embodiment I according to the present invention.
Figure 2:
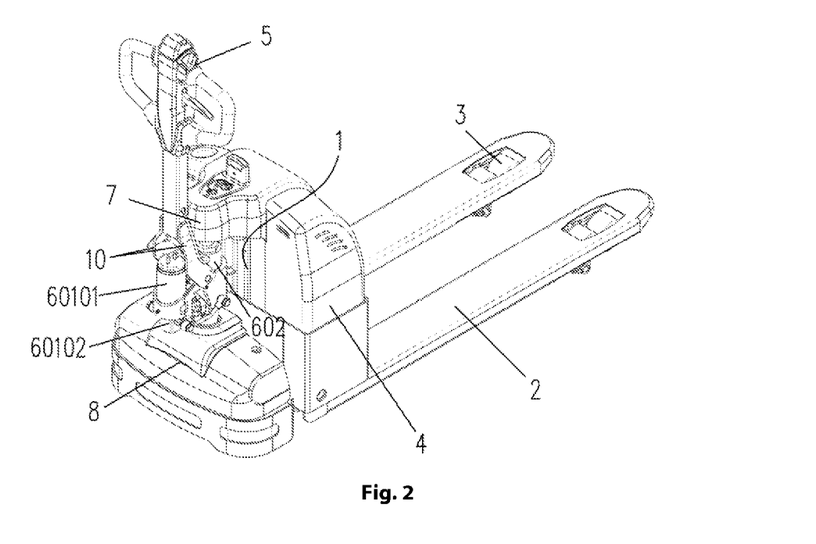
FIG. 2 is a perspective view of FIG. 1.

For connection with the handle mounting portion 9, the operating handle 5 is provided with a pair of connecting pieces 10 hinged with the handle mounting portion 9, a passage hole 11 of the driving mechanism is reserved between the pair of connecting pieces 10; the connecting pieces 10, which can be made of plates and whose shape is determined based on actual needs, work with hinge pins to connect the operating handle and the handle mounting portion together so as to achieve the up and down rotation of the operating handle; besides, the passage hole of the driving mechanism ensures the normal operation of the operating handle; when the driving mechanism 601 is in the passage opening 11 of the driving mechanism, the pair of the connecting pieces 10 are on each side of the driving mechanism 601. In order to make the structure as compact as possible, when the operating handle 5 is vertical, at least part of the driving mechanism 601 is under the operating handle 5 such that the projection of the operating handle partially coincides with that of the driving mechanism and the coinciding part is as close to the pump case as possible.

Figure 5:
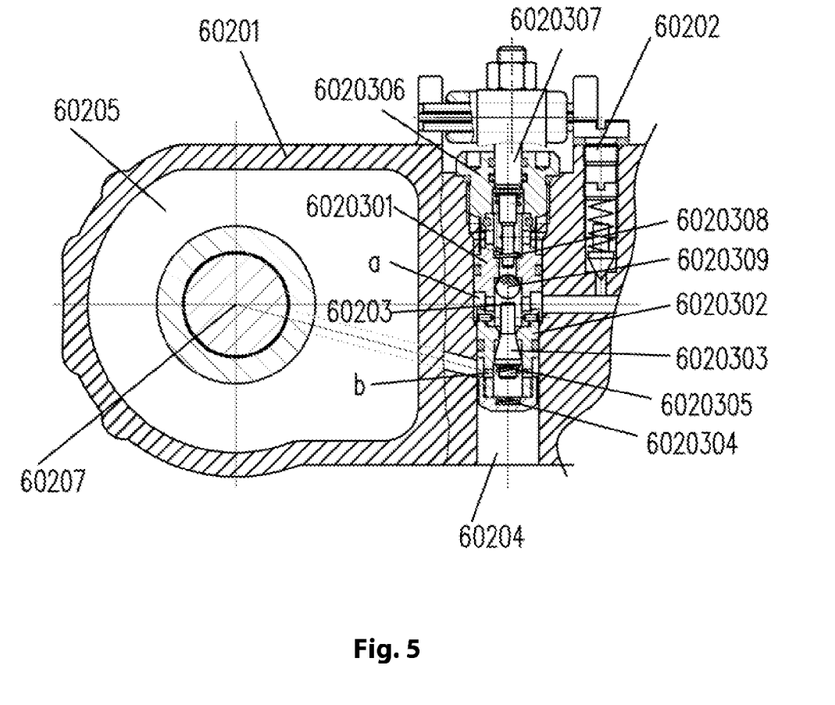
FIG. 5 is a schematic diagram of the manual check valve in FIG. 4.

In order to decrease the volume and make the layout more sound and compact, in the embodiment, the manual check valve 60203 comprises an axial valve bush 6020301, an axial liquid incoming valve spool 6020302 fixedly connected with the axial valve bush 6020301, a pushing valve spool 6020303 arranged in the axial liquid incoming valve spool 6020302, a cap nut 6020304 secured at the end of the axial liquid incoming valve spool 6020302, a spool spring 6020305 one end of which acts on the cap nut 6020304 and the other end acts on the pushing valve spool 6020303, a valve stem bush 6020306 arranged at the end of the axial valve bush 6020301, a spindle 6020307 inserted in the axial valve bush 6020301 and one end of which projects out of the valve stem bush 6020306, a spindle spring 6020308 one end of which acts on the spindle 6020307 and the other end acts on the axial valve bush 6020301, and a pushing steel ball 6020309 located between the spindle 6020307 and the pushing valve spool 6020303. The axial liquid incoming valve spool 6020302 and the axial valve bush are fixed in the spool hole of the case, clearance is reserved between the cap nut 6020304 and the spool hole for the passage of the hydraulic oil, the valve stem bush 6020306 is screwed to the end of the spool hole, and the other end of the spool hole corresponding to the valve stem bush 6020306 is the high-pressure oil inlet 60204; the spindle 6020307, inserted in the valve stem bush 6020306 and the axial valve bush 6020301 through clearance fit and capable of sliding axially, pushes the steel ball under the action of the operating handle and recovers under the action of the spindle spring; the forward inlet a is arranged at the end of the axial valve bush 6020301 and the forward outlet b is arranged on the axial liquid incoming spool 6020302. The pushing spool 6020303 is arranged in the axial liquid incoming spool 6020302 which has an airtight valve port for fitting with the pushing spool 6020303, and the axial liquid incoming spool 6020302 and the axial valve bush 6020301 are fixed to form one body through rivets or welding.

Figure 6:
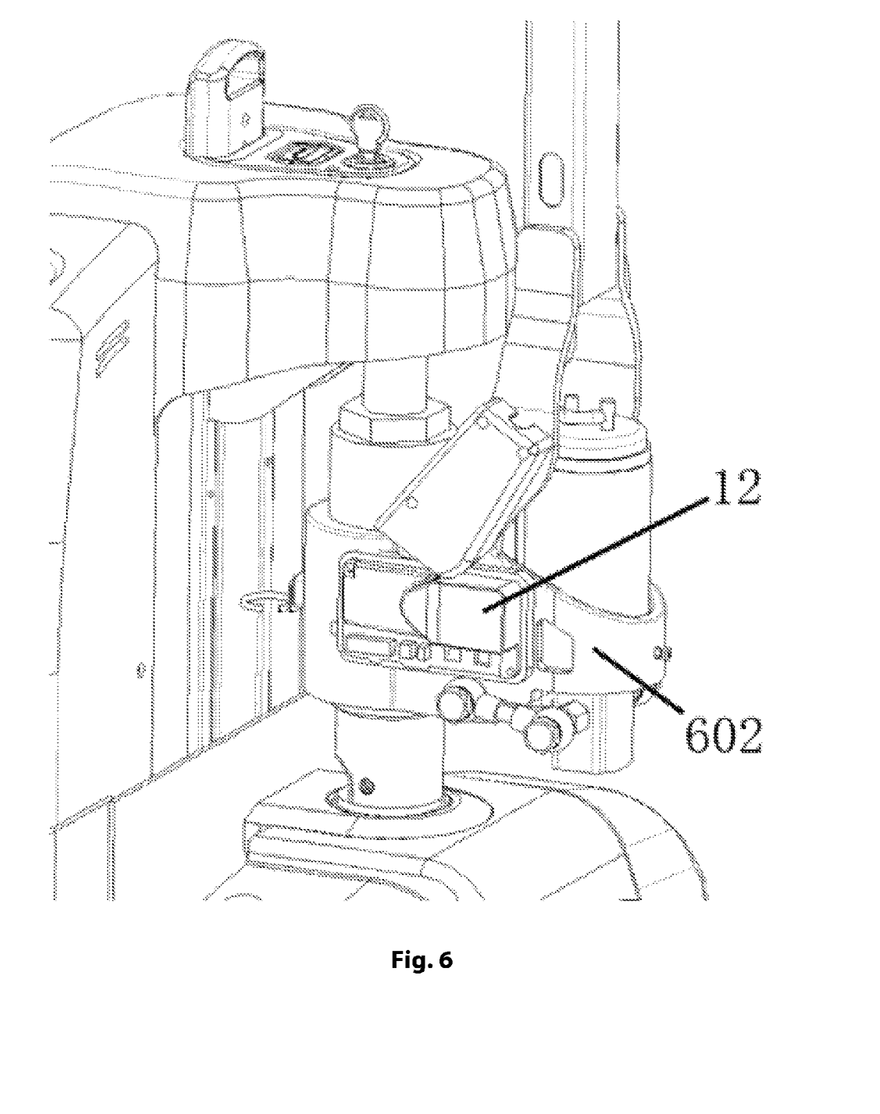
FIG. 6 is a schematic diagram of Embodiment II according to the present invention.

Embodiment II, as shown in FIG. 6, a truck comprises a frame 1 fixed with a top cover 7, two symmetrically-arranged forklifts 2 connected with the frame 1, driven wheels 3 mounted on the forklifts 2, a battery unit 4 comprising a battery and a battery box which is permanently connected with the frame, an operating handle 5, a driving wheel unit 8 intended for driving the electric truck to move and an appliance controller 12, which are all known art, so no further details will be given herein; it also comprises a hydraulic pump station system 6 which is different from the prior-art hydraulic pump station system; in the embodiment, the hydraulic pump station system 6 comprises a driving mechanism 601, comprising a motor 60101 and a hydraulic pump 60102 connected with the motor 60101, and a pump body 602 with a case 602601, wherein the motor 60104 and the case 60201 are permanently connected, the hydraulic pump, which can be a gear pump or a vane pump, can be connected with the motor directly or by connecting pieces such as couplings and operates under the driving of the motor, the top of the pump body 602 is permanently connected with the top cover 7 and the bottom is connected with the driving wheel unit 8, a handle mounting portion 9 is provided on the pump case 60201 and connected with the operating handle 5, the pump body 602 is capable of propping up the top cover 7 driven by the driving mechanism 601 and capable of lowering it without any power under the control of the operating handle 5, and the driving mechanism 601 is located on the side of the handle mounting portion 9 opposite to the pump body 602 and away from the forklifts 2; through arrangement such that the driving mechanism is located on the outside of the pump body, i.e. the other side of the handle mounting portion opposite to the pump body, enables the driving mechanism to be away from the forklifts, saves the space under the top cover and shortens the distance between the driving wheel and the driven wheels of the truck. In order to make the overall structure of the truck more compact, the appliance controller 12 is fixed on the pump body 602 for easy installation, repair and maintenance of the .appliance controller 12; preferably, the appliance controller 12 is located on the longitudinal side of the pump body 602.

What is claimed is:

1. A truck, comprising a frame (1), forklifts (2) connected with the frame (1), driven wheels (3) mounted on the forklifts (2), a battery unit (4), an operating handle (5), a hydraulic pump station system (6), a top cover (7) permanently connected with the frame (1) and a driving wheel unit (8) intended for driving the truck to move, wherein the hydraulic pump station system (6) comprises a driving mechanism (601) and a pump body (602) with a case (60201), a top of the pump body (602) is permanently connected with the top cover (7) and a bottom of the pump body (602) is connected with the driving wheel unit (8), a handle mounting portion (9) is provided on the pump case (60201) and connected with the operating handle (5), the pump body (602) is capable of propping up the top cover (7) driven by the driving mechanism (601) and capable of lowering it without any power under the control of the operating handle (5), and the driving mechanism (601) is located on a side of the handle mounting portion (9) opposite to the pump body (602) and is further away from the forklifts (2) than the handle mounting portion (9), wherein the handle mounting portion (9) is arranged between the driving mechanism (601) and the pump body (602); wherein the driving mechanism (601) comprises a motor (60101) permanently connected with the pump case (60201) and a hydraulic pump (60102) connected with the motor (60101).

2. The truck according to claim 1, wherein the motor (60101) and the hydraulic pump (60102) are vertically arranged.

3. The truck according to claim 1, wherein, when the operating handle is vertical, at least part of the driving mechanism (601) is under the operating handle (5).

4. The truck according to claim 1, wherein the pump case (60201) is provided with a base plate (60208) extending away from the forklifts (2); an edge of the base plate (60208) are provided with enclosure plates (60209) extending upwards, the motor (60101) is fixed on the base plate (60208) and the enclosure plates (60209) enclose part of the motor (60101) at least; the handle mounting portion (9) is arranged between the enclosure plates (60209) and the pump case (60201) and connected with both the enclosure plates (60209) and the pump case (60201).

5. The truck according to claim 4, wherein the handle mounting portion (9) comprises a pair of hinged mounting plates which can be integral-formed or assembled with the pump case (60201), the base plate (60208) and the enclosure plates (60209).

6. The truck according to claim 4, wherein the hydraulic pump (60102) is located under the motor (60101).

7. The truck according to claim 1, wherein the operating handle (5) is provided with a pair of connecting pieces (10) hinged with the handle mounting portion (9) and a passage hole (11) of the driving mechanism is reserved between the pair of connecting pieces (10).

8. The truck according to claim 7, wherein when the driving mechanism (601) is in the passage hole (11) of the driving mechanism, the pair of the connecting pieces (10) are on each side of the driving mechanism (601).

9. A truck, comprising a frame (1), forklifts (2) connected with the frame (1), driven wheels (3) mounted on the forklifts (2), a battery unit (4), an operating handle (5), a hydraulic pump station system (6), a top cover (7) permanently connected with the frame (1), a driving wheel unit (8) intended for driving the truck to move and an appliance controller (12), wherein the hydraulic pump station system (6) comprises a driving mechanism (601) and a pump body (602) with a case (60201), a top of the pump body (602) is permanently connected with the top cover (7) and a bottom of the pump body (602) is connected with the driving wheel unit (8), a handle mounting portion (9) is provided on the pump case (60201) and connected with the operating handle (5), the pump body (602) is capable of propping up the top cover (7) driven by the driving mechanism (601) and capable of lowering it without any power under the control of the operating handle (5), the driving mechanism (601) is located on a side of the handle mounting portion (9) opposite to the pump body (602) and is further away from the forklifts (2) than the handle mounting portion (9), and the appliance controller (12) is fixed on the pump body (602), wherein the handle mounting portion (9) is arranged between the driving mechanism (601) and the pump body (602); wherein the driving mechanism (601) comprises a motor (60101) permanently connected with the pump case (60201) and a hydraulic pump (60102) connected with the motor (60101).

10. The truck according to claim 1, wherein the hydraulic pump station system (6) and the top cover (7) are outside the frame (1), and a longitudinal center section of the driving mechanism (601) coincides with a longitudinal section of the truck.

11. The truck according to claim 10, wherein the battery unit (4) is permanently connected with the frame (1); the pump body (602) is arranged between the driving mechanism (601) and the battery unit (4) and the driving mechanism (601) is away from the battery unit (4).

12. The truck according to claim 2, wherein the pump case (60201) is provided with a base plate (60208) extending away from the forklifts (2); an edge of the base plate (60208) are provided with enclosure plates (60209) extending upwards, the motor (60101) is fixed on the base plate (60208) and the enclosure plates (60209) enclose part of the motor (60101) at least.

13. The truck according to claim 12, wherein the handle mounting portion (9) comprises a pair of hinged mounting plates which can be integral-formed or assembled with the pump case (60201), the base plate (60208) and the enclosure plates (60209).

14. The truck according to claim 12, wherein the hydraulic pump (60102) is located under the motor (60101).

15. The truck according to claim 1, wherein the operating handle (5) is provided with a pair of connecting pieces (10) hinged with the handle mounting portion (9) and a passage hole (11) of the driving mechanism is reserved between the pair of connecting pieces (10).

16. The truck according to claim 2, wherein the operating handle (5) is provided with a pair of connecting pieces (10) hinged with the handle mounting portion (9) and a passage hole (11) of the driving mechanism is reserved between the pair of connecting pieces (10).

17. The truck according to claim 3, wherein the operating handle (5) is provided with a pair of connecting pieces (10) hinged with the handle mounting portion (9) and a passage hole (11) of the driving mechanism is reserved between the pair of connecting pieces (10).

18. The truck according to claim 15, wherein when the driving mechanism (601) is in the passage hole (11) of the driving mechanism, the pair of the connecting pieces (10) are on each side of the driving mechanism (601).

19. The truck according to claim 16, wherein when the driving mechanism (601) is in the passage hole (11) of the driving mechanism, the pair of the connecting pieces (10) are on each side of the driving mechanism (601).

20. The truck according to claim 1, further comprising: a manual check valve (60203) with a forward inlet (a) and a forward outlet (b) arranged in the pump case (60201), and an oil delivery cylinder (60207) arranged in the pump case (60201), wherein the pump case (60201) is provided with a high-pressure oil inlet (60204) communicating the forward outlet (b), an oil storage chamber (60205) communicating the forward inlet (a) and an oil outlet (60206) communicating the oil storage chamber (60205).

* * * * *